United States Patent Office 3,231,478
Patented Jan. 25, 1966

3,231,478
METHOD OF PREPARING L-ISOLEUCINE BY FERMENTATION
Teijiro Uemura, Sendai-shi, Miyagi-ken, Shinji Okumura, Yokohama-shi, Kanagawa-ken, Yoshitsugu Fujii, Sendai-shi, Miyagi-ken, and Kazuo Komagata, Tokyo, Japan, assignors to Ajinomoto Co. Inc., Tokyo, Japan
No Drawing. Filed Oct. 18, 1963, Ser. No. 317,162
Claims priority, application Japan, Oct. 29, 1962, 37/47,954
14 Claims. (Cl. 195—29)

This invention relates to the manufacture of optically active amino acids, and more particularly to a method of preparing L-isoleucine by fermentation.

L-isoleucine is one of the amino acids essential for the nutrition of vertebrates and man, and there is an increasing demand for the acid for medical applications, as a food supplement, and as an animal feed supplement.

L-isoleucine can be extracted from protein hydrolyzates. It is difficult, however, to separate L-isoleucine from L-leucine by which it is accompanied in protein. Synthetic methods of organic chemistry yield a mixture of L-isoleucine, D-isoleucine, L-alloisoleucine, and D-alloisoleucine from which L-isoleucine is isolated only by relatively complex methods. L-isoleucine prepared by the known methods, therefore, is costly and not available in large amounts.

The object of the invention is a method by which L-isoleucine can be prepared from readily available materials in a simple manner and at low cost.

We have found that L-isoleucine is formed rapidly and in relatively high concentration in nutrient media which contain threonine and on which certain microorganisms are cultured under aerobic conditions. Suitable microorganisms are members of the genus Brevibacterium, such as *Brevibacterium ammoniagenes* (A.T.C.C. No. 6872), *Brevibacterium flavum* No. 90 (A.T.C.C. No. 15168), and Brevibacterium No. 20 (A.T.C.C No 15169); also members of the genus Corynebacterium, such as Corynebacterium No. 51 (A.T.C.C. No. 15167); and members of the genus Arthrobacter, such as *Arthrobacter citreus* No. 129 (A.T.C.C. No. 15170).

*Brevibacterium ammoniagenes*, A.T.C.C. No. 6872, is described on page 411 of "Bergey's Manual of Determinative Bacteriology," 7th edition. The other species of microorganisms are characterized by the properties listed in the following tables, and have not heretofore been described.

TABLE I

| | Brev. No. 20 | Corynebacterium No. 51 |
|---|---|---|
| Shape and motility | Rods, 0.6 x 0.8 x 1.5 microns, Rarely occurring in pairs, spore not formed, non-motile, not acid-fast, Gram-positive. | Rod, 0.8 x 1.5-2.5 microns Branching and short-rod are often observed. spore not formed, non-motile, not acid-fast, Gram positive. |
| Bouillon agar colonies | Circular, smooth, raised to convex, entire, dully yellow opaque, homogeneous. | Circular, smooth, raised to convex, entire, dully yellow, opaque. |
| Bouillon agar slant | | |
| Bouillon broth | Moderate growth | Good growth. |
| Bouillon gelatin stab | Liquefaction | Liquefaction. |
| Pigment of cell | | |
| Milk | Coagulate | Unchanged. |
| B. C. P. Milk | Acidic | Neutral. |
| Nitrate reduction | Positive | Positive. |
| Nitrate respiration | Negative | Negative. |
| Indole | Not produced | Not produced. |
| Hydrogen sulfide | do | Produced. |
| Starch hydrolysis | Hydrolyzed | Hydrolyzed. |
| Gas and Acid from carbohydrates. | Neither acid nor gas are produced from glycerol, xylose, glucose, sucrose, lactose and starch. | Neither acid nor gas are produced from glycerol, xylose, glucose, sucrose, lactose and starch. |
| Gas and Acid by Hugh-Lifeson's method. | Neither acid nor gas are produced from glucose and lactose. | Aerobically acid is produced from glucose. Aerobically gas is not produced. Neither acid nor gas are produced anaerobically. |
| Assimilation of— | | |
| Glucose | − | +. |
| Gluconic acid | − | +. |
| Citric acid | − | +. |
| m-Hydroxy benzoic acid. | − | +. |
| Gentidic acid | − | +. |
| Succinic acid | − | −. |
| Benzoic acid | − | −. |
| Salicilic acid | − | −. |
| p-Hydroxy benzoic acid. | − | −. |
| Anthranylic acid | − | −. |
| Protocatecuic acid. | | |
| Catalase | Positive | Positive. |
| Growth temperature: | | |
| Optimum | 20–25° C | 25–30° C. |
| Suboptimal | Below 37° C | |
| No growth | 42° C | |
| Habitat | Soil | Soil. |
| Growth response | | |

TABLE II

| | *Arthrobacter citreus* No. 129 | *Brev. flavum* No. 90 |
|---|---|---|
| Shape and motility | Rod, 1.0 x 2-3 microns, spore not formed, not acid-fast. Within 15 hrs. from inoculation slightly motile and many of them are Gram-negative. After 15 hrs. from inoculation non-motile. After 24 hrs. from inoculation Gram-positive. | Short rod, 0.5 x 0.6-2.0 microns, spore not formed, non-motile, Gram-positive. |
| Bouillon agar colonies | Circular, smooth, raised to convex, entire, dully yellow, opaque, homogeneous. | Circular, smooth, flat, entire, dry. |
| Bouillon agar slant | Good growth, fibrous, glossy, smooth, dully yellow. | Fibrous, butyrous, moderate growth, dully yellowish glossy. |
| Bouillon broth | Good growth | Good growth except surface. |
| Bouillon gelatin stab | Liquefaction | No liquefaction. |
| Pigment of cell | | Yellow. |
| Milk | Unchanged | |
| B.C.P. Milk | Alkaline, not peptonized. | Slightly alkaline. |
| Nitrate reduction | Positive | Positive. |
| Nitrate respiration | Negative | |
| Indole | Not produced | Not produced. |
| Hydrogen sulfide | do | Hardly produced. |
| Starch hydrolysis | Hydrolyzed | Not hydrolyzed. |
| Gas and Acid from carbohydrates. | Neither acid nor gas are produced from glycerol, xylose, glucose, sucrose, lactose and starch. | Acid produced from glucose, fructose, mannose, sucrose and maltose, but gas not produced from them. Neither acid nor gas are produced from galactose, lactose, glycerol, mannitol, sorbitol, erythritol, adonitol, xylose, arabinose, mellizitose, rhamnose, raffinose, starch, dextrin, inulin, glycogen, trehalose, melibiose, cellolbiose and α-methylglucoside. |
| Gas and Acid by Hugh-Lifeson's method. | Neither acid nor gas are produced from glucose and lactose. | |

TABLE II (Continued)

|  | Arthrobacter citreus No. 129 | Brev. flavum No. 90 |
|---|---|---|
| Assimilation of: |  |  |
| Glucose | + |  |
| Gluconic acid | − |  |
| Citric acid | + | −. |
| m-Hydroxy benzoic acid. | + |  |
| Gentidic acid | + |  |
| Succinic acid | + |  |
| Benzoic acid | − |  |
| Salicilic acid | − |  |
| p-Hydroxy benzoic acid. |  |  |
| Anthranylic acid | − |  |
| Protocatecuic acid | − |  |
| Catalase | Positive | Positive. |
| MR, VP reaction |  | Negative. |
| Ammonia production |  | Produced. |
| Urease |  | Positive. |
| Growth pH: |  |  |
| Optimum |  | 6.0–8.0. |
| No growth |  | Below 5.0 and over 9.0. |
| Growth temperature: |  |  |
| Optimum | 20–30° C | 20–37° C. |
| Suboptimal | Below 37° C |  |
| No growth | 42° C |  |
| Habitat | Soil |  |
| Growth response |  | L-leucine. |

The nutrient medium on which the microorganisms of the invention are cultured for the production of L-isoleucine must contain a carbon source, a nitrogen source, organic nutrients and traces of mineral matter, as are conventional. The medium further must include threonine if L-isoleucine is to be produced in significant amounts.

The threonine is metabolized by the microorganisms during the formation of isoleucine. Best results are obtained with the use of 0.5 to 5 percent threonine in the fermentation medium.

The threonine may be admixed to the nutrient medium either in a single bath when fermentation is started, or in several batches spaced over the fermentation period. Yields of L-isoleucine are higher in the presence of D-threonine than in the presence of L-threonine, but L-threonine also is effective to some extent in promoting the formation of L-isoleucine. The threonine admixed to the medium may, therefore, be a mixture of D-threonine and L-threonine, such as the reaction mixture obtained in the chemical synthesis of threonine.

Suitable carbon sources include, but are not limited to, glucose, fructose, sucrose, maltose, starch, starch hydrolyzate, molasses, various organic acids, and polyhydric alcohols. The compounds which serve as a carbon source are preferably present in the nutrient medium in amounts of 3 to 20 percent.

Ammonia, urea and ammonium salts are the most readily available nitrogen sources. The amine radical of the threonine in the medium also is a nitrogen source. Other amino acids and organic bases may furnish nitrogen. The compound serving as a nitrogen source should be present in an excess over the amount required for the growth of the microorganisms. Its concentration, therefore, should be normally between 0.3 and 20 percent.

Conventional organic nutrients are employed in the process of the invention, such as amino acids, vitamins, fatty acids, corn steep liquor, yeast extract, peptone, meat extract, soy bean cake, and various extracts of living organisms. The essential inorganic ions, some or all of which may be present include phosphate, sulfate, potassium, iron, manganese, and magnesium.

The pH value of the medium must be maintained between 6.0 and 9.0 for a good yield of L-isoleucine, and for a short fermentation period. The nutrient medium is kept neutral or slightly alkaline by additions of calcium carbonate, urea, ammonia, or alkali metal hydroxides in a manner not novel in itself. The culture is aerated during fermentation. Its temperature is preferably kept between 27° C. and 40° C. during fermentation.

A maximum concentration of L-isoleucine is normally reached within two to four days, whereupon fermentation is terminated. The accumulation of L-isoleucine in the culture then amounts to 0.2 to 0.5 gram per deciliter. The L-isoleucine is readily recovered from the fermentation broth in pure form because of the absence of other compounds having closely similar properties. Conventional methods may be employed for isolating the L-isoleucine, such as removal of the microorganism cells from the broth by filtration, removal of inorganic ions and other contaminants by ion exchange, and crystallization of the amino acid from the purified broth.

The process of the invention is further illustrated by the following examples, but it will be understood that it is not limited thereto.

Example 1

A nutrient medium was prepared from a potato starch hydrolyzate to the following composition:

| | | |
|---|---|---|
| Glucose | percent | 10 |
| D-threonine | do | 1.5 |
| $KH_2PO_4$ | do | 0.1 |
| $MgSO_4 \cdot 7H_2O$ | do | 0.04 |
| Ferrous ion | p.p.m | 2 |
| Manganese ion | p.p.m | 2 |
| Yeast extract | percent | 0.4 |
| Biotin | micrograms per liter | 4 |
| Vitamin $B_1$ | do | 200 |
| pH 7.0. | | |

20 milliliter batches of the medium were placed in 500 milliliter flasks, and the flasks with their contents were sterilized at 110° C. for five minutes. The sterilized medium was inoculated with *Brevibacterium ammoniagenes* (A.T.C.C. No. 6872) which had been grown on a bouillon agar slant. 0.1 percent urea was added to the medium.

The fermentation was carried out at 30° C. while the flasks were being shaken. Further additions of urea were made in the period 20 to 50 hours from the start of fermentation in order to hold the pH value between 7 and 8.7. The total urea additions amounted to 0.2%.

The fermentation was discontinued after 64 hours. An L-isoleucine content of 0.65 gram per deciliter was found upon assay of the broth. The glucose and D-threonine originally present were almost completely consumed.

The several batches of broth were combined and filtered to remove bacterial cells. The filtrate was passed over a strongly acid cation exchange resin of the styrene sulfonic acid type in the H-form to remove ammonium and carbonate ions, and the purified solution was partly evaporated in order to cause crystallization of the L-isoleucine. 5.2 grams of crude L-isoleucine crystals were recovered from one liter of fermentation broth.

When *Brevibacterium ammoniagenes* was cultured in the same manner on a medium of almost identical composition, but containing 2% L-threonine instead of the D-threonine, only 0.25 gram L-isoleucine per deciliter was found in the broth after fermentation.

Example 2

A nutrient medium was prepared from a potato starch hydrolyzate base to the following composition:

| | | |
|---|---|---|
| Glucose | percent | 10 |
| D-threonine | do | 2 |
| $KH_2PO_4$ | do | 0.1 |
| Ferrous ion | p.p.m | 2 |
| $MgSO_4 \cdot 7H_2O$ | percent | 0.04 |
| Manganese ion | p.p.m | 2 |
| Biotin | micrograms per liter | 10 |
| Yeast extract | percent | 0.2 |
| pH 7.0. | | |

20 milliliter batches of the medium were sterilized in 500 milliliter flasks as described in Example 1, and were inoculated with *Brevibacterium flavum* No. 90 which had been grown on bouillon agar slants. 0.4 percent urea were added to the inoculated medium. Aerobic fermentation at 30° C. required addition of 0.4% urea after 22 hours to maintain the desired pH. Fermentation was interrupted after 64 hours.

The fermentation broth then was assayed and found to contain 0.41 gram L-isoleucine and 1.05 grams L-valine per deciliter.

*Example 3*

A culture medium was prepared from a potato hydrolyzate to the following composition:

| | |
|---|---|
| Glucose _____percent__ | 5 |
| D-threonine _____do____ | 1 |
| KH$_2$PO$_4$ _____do____ | 0.1 |
| MgSO$_4$·7H$_2$O _____do____ | 0.04 |
| Ferrous ion _____p.p.m__ | 2 |
| KCl _____percent__ | 0.01 |
| Yeast extract _____do____ | 0.2 |
| Peptone _____do____ | 0.1 |
| pH 7.0. | |

20 milliliter batches of the medium were sterilized in 500 milliliter shaking flasks, and inoculated with Corynebacterium No. 51 which was grown on bouillon agar slants. 1 percent calcium carbonate, separately sterilized, was then added to the medium, and fermentation was carried out at 30° C. with shaking.

An assay of the fermentation broth after 65 hours revealed the presence of 0.25 gram L-isoleucine per deciliter.

When an otherwise identical medium was prepared with 2.0% L-threonine instead of the 1% D-threonine, and fermentation was carried out in the manner described in the preceding paragraphs, the L-isoleucine concentration determined by assay was 0.23 gram per deciliter.

*Example 4*

A culture medium was prepared as in Examples 1 to 3 to the following composition:

| | |
|---|---|
| Glucose _____percent__ | 10 |
| D-threonine _____do____ | 0.7 |
| KH$_2$PO$_4$ _____do____ | 0.1 |
| MgSO$_4$·7H$_2$O _____do____ | 0.04 |
| Ferrous ion _____p.p.m__ | 2 |
| Manganese ion _____p.p.m__ | 2 |
| Yeast extract _____percent__ | 0.2 |
| Corn steep liquor _____do____ | 0.2 |
| Biotin _____micrograms per liter__ | 4 |
| Vitamin B$_1$ _____do____ | 200 |
| Ammonium sulfate _____percent__ | 1.0 |
| pH 7.0. | |

After sterilization at 110° C. for 5 minutes, 20 milliliter batches of the medium in 500 milliliter flasks were inoculated with *Arthrobacter citreus* No. 129 grown on bouillon agar slants. 1 percent separately sterilized calcium carbonate was admixed to the inoculated medium, and fermentation was carried out at 30° C. with shaking. 0.8 percent D-threonine was added to the medium after 24 hours, and fermentation was continued for a total of 94 hours, while the pH was maintained at 7.0 to 8.5. The L-isoleucine content of the broth was determined by assay to be 0.68 gram per deciliter.

When D-threonine in the culture medium was replaced by an equal amount of L-threonine, and the fermentation was performed under otherwise identical conditions, only 0.21 gram L-isoleucine was found in one deciliter of the fermentation broth.

*Example 5*

A culture medium was prepared to the following composition:

| | |
|---|---|
| Glucose _____percent__ | 5 |
| D-threonine _____do____ | 0.7 |
| KH$_2$PO$_4$ _____do____ | 0.1 |
| MgSO$_4$·7H$_2$O _____percent__ | 0.04 |
| Ferrous ion _____p.p.m__ | 2 |
| Manganese ion _____p.p.m__ | 2 |
| Ammonium sulfate _____percent__ | 1 |
| Yeast extract _____do____ | 0.2 |
| Corn steep liquor _____do____ | 0.2 |
| Biotin _____micrograms per liter__ | 4 |
| Vitamin B$_1$ hydrochloride _____do____ | 200 |
| pH 7.0. | |

20 milliliter batches of the medium were sterilized in 500 milliliter flasks and inoculated with Brevibacterium No. 20 grown on bouillon agar slants. 2.5 percent sterile calcium carbonate was then added to the medium, and fermentation was carried out at 30° C. with shaking. 0.8 percent D-threonine was added to the medium after 24 hours, and the fermentation was continued over a total period of 94 hours while the pH was maintained between 7.0 and 8.5. An assay of the fermentation broth showed the presence of 0.51 gram L-isoleucine per deciliter.

It should be understood, of course, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. A method of preparing L-isoleucine which comprises culturing a microorganism selected from the group consisting of *Brevibacterium ammoniagenes* (A.T.C.C. No. 6872), *Brevibacterium flavum* No. 90 (A.T.C.C. No. 15168), Brevibacterium No. 20 (A.T.C.C. No. 15169), Corynebacterium No. 51 (A.T.C.C. No. 15167), and *Arthrobacter citreus* No. 129 (A.T.C.C. No. 15170) on an aqueous nutrient medium including a carbon source, a nitrogen source, an organic nutrient, and essential inorganic ions, and an amount of threonine substantially between 0.5 percent and 5 percent of said medium.

2. A method as set forth in claim 1, wherein said microorganism is cultured on said medium under aerobic conditions.

3. A method as set forth in claim 1, wherein said medium is held at a temperature of 27° C. to 40° C. during said culturing.

4. A method as set forth in claim 1, wherein said medium is kept between pH values of 6.0 and 9.0 during said culturing.

5. A method as set forth in claim 1, wherein said threonine is D-threonine.

6. A method as set forth in claim 1, wherein said carbon source is present in said medium in an amount of 3 to 20 percent, and said nitrogen source is present in said medium in an amount of 0.3 to 20 percent.

7. A method as set forth in claim 1, wherein said amount of threonine is initially present in said medium and decreases during said culturing by being metabolized by said microorganism.

8. A method as set forth in claim 1, wherein a portion of said amount of threonine is initially present in said medium, and the remainder of said amount of threonine is added to said medium after said portion of said threonine has at least been partly metabolized by said microorganism.

9. A method as set forth in claim 1, wherein said microorganism is cultured on said medium under aerobic conditions at a temperature of 27° C. to 40° C. and at a pH between 6.0 and 9.0, said carbon source being present in said medium in an amount of 3 to 20 percent, and said nitrogen source being present in said medium in an amount of 0.3 to 20 percent.

10. A method as set forth in claim 9, wherein said microorganism is *Brevibacterium ammoniagenes* (A.T.C.C. No. 6872).

11. A method as set forth in claim 9, wherein said microorganism is *Brevibacterium flavum* No. 90 (A.T.C.C. No. 15168).

12. A method as set forth in claim 9, wherein said microorganism is Brevibacterium No. 20 (A.T.C.C. No. 15169).

13. A method as set forth in claim 9, wherein said microorganism is Corynebacterium No. 51 (A.T.C.C. No. 15167).

14. A method as set forth in claim 9, wherein said microorganism is *Arthrobacter citreus* No. 129 (A.T.C.C. No. 15170).

References Cited by the Examiner

UNITED STATES PATENTS 3,086,918   4/1963   Chibata et al. _____ 195—47

A. LOUIS MONACELL, *Primary Examiner.*